(12) United States Patent
Sanga et al.

(10) Patent No.: US 11,492,138 B2
(45) Date of Patent: Nov. 8, 2022

(54) AIRCRAFT SEARCH LIGHT SYSTEM

(71) Applicant: Goodrich Corporation, Charlotte, NC (US)

(72) Inventors: Srinivas Sanga, Bangalore (IN); Nitin Kumar Goyal, Bangalore (IN); Manohar Balu, Bengaluru (IN)

(73) Assignee: Goodrich Corporation, Charlotte, NC (US)

( * ) Notice: Subject to any disclaimer, the term of this patent is extended or adjusted under 35 U.S.C. 154(b) by 40 days.

(21) Appl. No.: 17/134,354

(22) Filed: Dec. 26, 2020

(65) Prior Publication Data
US 2021/0323694 A1     Oct. 21, 2021

(30) Foreign Application Priority Data

Apr. 16, 2020  (IN) .............................. 202041016488

(51) Int. Cl.
*B64D 47/02*      (2006.01)
*G06K 9/00*       (2022.01)
(Continued)

(52) U.S. Cl.
CPC ............ *B64D 47/02* (2013.01); *B64D 47/08* (2013.01); *G06V 20/13* (2022.01); *G10L 15/22* (2013.01); *G10L 15/30* (2013.01); *G10L 2015/223* (2013.01); *H04N 5/2253* (2013.01); *H04N 5/2257* (2013.01); *H04N 5/23203* (2013.01)

(58) Field of Classification Search
CPC ........ B64D 47/02; B64D 47/08; G06V 20/13; G10L 15/22; G10L 15/30; G10L 2015/223
See application file for complete search history.

(56) References Cited

U.S. PATENT DOCUMENTS 4,471,683 A    9/1984  Brown
5,589,901 A   12/1996  Means
(Continued)

FOREIGN PATENT DOCUMENTS

| EP | 3072817 | | 9/2016 | |
|----|---------|---|--------|---|
| EP | 3072817 B1 | * | 9/2017 | ............. B64C 37/02 |
| GB | 2338694 | | 12/1999 | |

OTHER PUBLICATIONS

ROUTIN__EP3072817B1__06-2017.pdf (Year: 2017).*
(Continued)

*Primary Examiner* — Tracie Y Green
(74) *Attorney, Agent, or Firm* — Snell & Wilmer L.L.P.

(57) ABSTRACT

An aircraft search light system is disclosed. Voice commands may be used to control one or more aspects of the operation of the aircraft search light system, including to initiate the detection of objects in image data, to select a particular object in the image data to be tracked by the search light, and the like. The search light may be moved based upon processed image data, for instance such that the selected object continues to be illuminated by the search light. Voice commands may also be used to initiate movement the search light relative to the selected object (e.g., to keep the selected object in the field of view of the search light). Audio output may be generated by the aircraft search light system to provide information to aircraft personnel on the processed image data, and on which one or more subsequent voice commands may be based.

20 Claims, 6 Drawing Sheets

(51) Int. Cl.
*G10L 15/22* (2006.01)
*G10L 15/30* (2013.01)
*B64D 47/08* (2006.01)
*G06V 20/13* (2022.01)
*H04N 5/232* (2006.01)
*H04N 5/225* (2006.01)

(56) References Cited

U.S. PATENT DOCUMENTS

| | | | |
|---|---|---|---|
| 7,881,832 | B2 | 2/2011 | Komer |
| 8,139,025 | B1 | 3/2012 | Krenz |
| 8,406,464 | B2 | 3/2013 | Karazi |
| 8,699,748 | B2 | 4/2014 | Huang et al. |
| 8,760,319 | B2 | 6/2014 | Kommuri et al. |
| 9,190,073 | B2 | 11/2015 | Dong et al. |
| 9,473,367 | B2 | 10/2016 | Tieftrunk et al. |
| 9,884,691 | B2 | 2/2018 | Jha et al. |
| 9,906,733 | B2 | 2/2018 | Boldt et al. |
| 9,940,724 | B2 | 4/2018 | Jia et al. |
| 10,136,492 | B2 | 11/2018 | Hessling-Von Heimendahl et al. |
| 10,346,685 | B2 | 7/2019 | Ding et al. |
| 10,450,082 | B1 | 10/2019 | Blanton et al. |
| 11,192,494 | B2 * | 12/2021 | Giffen ................... F21S 41/657 |
| 11,274,815 | B1 * | 3/2022 | Sure ........................ F21V 5/008 |
| 2003/0086251 | A1 * | 5/2003 | Hamilton ............... B64D 47/04 362/12 |
| 2012/0274775 | A1 * | 11/2012 | Reiffel ................... G06Q 30/08 348/158 |
| 2018/0115772 | A1 * | 4/2018 | Thompson ............ G06F 3/1423 |
| 2018/0343400 | A1 * | 11/2018 | Campbell .............. G02B 13/14 |
| 2020/0191946 | A1 * | 6/2020 | Kalyandurg .......... G01S 13/955 |
| 2021/0255625 | A1 * | 8/2021 | Baladhandapani ..... G06F 3/013 |

OTHER PUBLICATIONS

Wikipedia, "1982 Bristow Helicopters Bell 212 crash", https://en.wikipedia.org/w/index.php?title=1982_Bristow_Helicopters_Bell_212_crash&oldid=1037180647, pp. 1-5.

BBC News, "Mourning in Serbia after deadly baby rescue helicopter crash", https://www.bbc.co.uk/news/world-europe-31889073, Mar. 15, 2015, pp. 1-3.

Sepic et al., "Nurse, pilot killed in medical helicopter crash in Brainerd", MPR News, https://www.mprnews.org/story/2019/06/28/2-dead-1-injured-medical-helicopter-crash-brainerd, Jun. 28, 2019 12:04 PM, Updated: 9:05 p.m. | Posted: 7:04 a.m., pp. 1-4 [retrieved Mar. 22, 2022].

European Patent Office, European Search Report dated Sep. 13, 2021 in Application No. 21168307.3.

* cited by examiner

AIRCRAFT SEARCH LIGHT SYSTEM

CROSS-REFERENCE TO RELATED APPLICATIONS

This application claims priority to, and the benefit of, India Patent Application No. 202041016488, filed Apr. 16, 2020 and titled "AIRCRAFT SEARCH LIGHT SYSTEM," which is incorporated by reference herein in its entirety for all purposes.

FIELD

The present disclosure generally relates to the field of aircraft and, more particularly, to the control of aircraft search lights.

BACKGROUND

The helicopter search light is a device which can project a powerful beam of light of parallel rays and in a particular direction. Search lights are used in military and policing applications for night attacks, night-time defense, festival surveillance, object searching, object tracking, and rescue missions, including in difficult geographical terrains and/or adverse weather conditions. The search light may be a dimmable and moveable device for white light and infrared light which can be mounted on the belly or the nose of the helicopter. Rotation of the search light head can be performed with DC motors and a differential gear box, in which light head extraction and retraction can be achieved by rotating the motors in the same direction and in which search light head rotation can be achieved by rotating the motors in different directions.

Existing helicopter search lights have different modes of operation and different light output depending on multiple manual switch inputs by the crew. The crew has individual switches for each functionality to control the search light, functionality like controlling the head light position left, right, up or down, rotating the light head to a predefined position, different light output like IR or white light (focus light or flood light), and controlling the intensity of the light. The main purpose of the helicopter search light is to provide a moveable light source for searching for objects from the helicopter. Currently, all the functionalities of the helicopter search light have to be controlled manually by the helicopter crew. If the crew wants to make the light source focus on a particular object and track the movement of this object, they must manually control the switches according to the object movement and all while continuing to operate the helicopter.

SUMMARY

An aircraft search light system is presented herein. Both the configuration of such an aircraft search light system and the operational characteristics/operation/assembly/manufacture of such an aircraft search light system are within the scope of this Summary.

An aircraft search light system may include a search light, an actuator system interconnected with a search light, a camera and a controller that is operatively interconnected with both the actuator system (e.g., to control a position of the search light) and the camera (e.g., to use image data acquired by the camera to control the position of the search light).

One or more audio input devices may be interconnected with the controller. Aircraft personnel may provide audio/voice commands, through an audio input device, to control one or more aspects of the aircraft search light system. One or more audio output devices may be interconnected with the controller. Audio messages from the controller may be conveyed through one or more of the audio output devices.

The controller may include/utilize a database or other data structure to store predetermined audio/voice commands, along with the corresponding task/function. The aircraft search light system may be configured such that only audio/voice commands that are stored in relation to the controller may be used to control operation of the camera, search light, or both.

The controller may include/utilize a database or other data structure to store predetermined objects. The aircraft search light system may be configured such that the controller will only attempt to identify objects in the image data that are stored in in this database/data structure. This may reduce the imaging processing requirements of the aircraft search light system.

Objects that are identified by the controller (in the image data provided by the camera) may be audibly conveyed to aircraft personnel, for instance through one or more audio output devices. This audio message may summarize the objects that were identified in the image data (e.g., a number of detected objects; a number of detected objects in each class or type of detected object), may provide at least one characteristic or feature particular of each detected object, or both. Aircraft personnel may provide an audio/voice command through an audio input device to initiate an audio response from the aircraft search light system in accordance with the foregoing.

An audio/voice command through an audio input device may be input to the controller to select a particular object or objects in the image data for tracking purposes—such that the position of the search light is controlled (by the controller) to illuminate the selected object. The aircraft search light system may use image data to account for movement of the selected object with the field of view of the camera/search light, for instance to maintain the selected object within a predetermined region of the field of view of the camera/search light.

Various aspects are also addressed by the following paragraphs and in the noted combinations:

1. An aircraft search light system, comprising:
   a search light;
   an actuator system interconnected with said search light, wherein said actuator system is configured to move said search light in at least one dimension;
   a camera configured to acquire image data; and
   a controller operatively interconnected with said actuator system and said camera.

2. The aircraft search light system of paragraph 1, wherein said controller is configured to control movement of said search light, through said actuator system, based upon at least one voice command, said image data from said camera, or both.

3. The aircraft search light system of paragraph 1, wherein said controller is configured to control movement of said search light, through said actuator system, based upon at least one voice command, a movement of a detected and selected object in said image data from said camera, or both.

4. The aircraft search light system of any of paragraphs 1-3, wherein said actuator system is configured to move said search light in multiple dimensions.

5. The aircraft search light system of any of paragraphs 1-4, wherein said camera is a video camera.

6. The aircraft search light system of any of paragraphs 1-5, wherein said search light comprises said camera.
7. The aircraft search light system of any of paragraphs 1-6, wherein said camera is mounted to said search light.
8. The aircraft search light system of any of paragraphs 1-7, further comprising: at least one audio input device operatively interconnected with said controller.
9. The aircraft search light system of paragraph 8, wherein said at least one audio input device is selected from the group consisting of at least one microphone, a pilot/co-pilot headset, an external microphone, or the like.
10. The aircraft search light system of any of paragraphs 1-9, further comprising: an audio input to said controller.
11. The aircraft search light system of any of paragraphs 1-10, further comprising:
at least one audio output device operatively interconnected with said controller.
12. The aircraft search light system of paragraph 11, wherein said at least one audio output device is selected from the group consisting of a speaker, headphones, an earphone, a pilot/co-pilot headset, or the like.
13. The aircraft search light system of any of paragraphs 1-12, further comprising:
an audio output from said controller.
14. The aircraft search light system of any of paragraphs 1-13, further comprising:
an object detection module operatively interconnected with said controller, wherein said image data from said camera is provided to said object detection module.
15. The aircraft search light system of paragraph 14, wherein said object detection module is configured to only identify a plurality of predetermined objects in said image data from said camera.
16. The aircraft search light system of paragraph 15, wherein said plurality of predetermined objects is selected from the group consisting of humans, vehicles, trees, roads, streets, emergency vehicles, fire trucks, or the like.
17. The aircraft search light system of any of paragraphs 15-16, wherein said controller is configured to generate one or more audio outputs that encompass each of said plurality of predetermined objects that are identified by said object detection module.
18. The aircraft search light system of paragraph 17, wherein said controller is configured to generate said one or more audio outputs in response to receipt of a predetermined audio command.
19. The aircraft search light system of any of paragraphs 17-18, wherein said controller is configured such that said one or more audio outputs include at least one characteristic of a corresponding said object.
20. The aircraft search light system of paragraph 19, wherein said at least one characteristic is selected from the group consisting of object type, object color, object size, and object position information.
21. The aircraft search light system of any of paragraphs 1-20, wherein said controller is configured to provide an object detection function on a single object in said image data from said camera in response to receipt of object selection data.
22. The aircraft search light system of paragraph 21, wherein said object selection data is an object selection voice command provided to said controller.
23. The aircraft search light system of any of paragraphs 1-22, further comprising:
an audio input command database comprising a plurality of predetermined audio input commands for said controller, wherein said controller is configured to only respond to each predetermined audio input command of said plurality of predetermined audio input commands.
24. The aircraft search light system of paragraph 23, wherein said plurality of predetermined audio input commands are selected from the group consisting of a start detection command, a describe detected objects command, a lock object command, a stop detection command, a track object command, a first search light movement command that controls a direction of searchlight movement, and a second search light movement command that controls an amount of search light movement.
25. An aircraft comprising the aircraft search light system of any of paragraphs 1-24.
26. The aircraft of paragraph 25, wherein said aircraft is a helicopter.
27. A method of controlling a search light on an aircraft, comprising:
acquiring image data using a camera;
detecting a first object in said image data using a processor system comprising at least one processor; and
controlling movement of said search light, relative to said aircraft, using a controller, based upon said first object from said detecting, and receipt of at least one voice command provided to said controller.
28. The method of paragraph 27, wherein said acquiring comprises said camera being mounted on said search light.
29. The method of any of paragraphs 27-28, wherein said detecting is initiated in response to receipt of a detect object voice command by said controller.
30. The method of paragraph 29, further comprising:
identifying a plurality of objects in said image data using said at least one processor, wherein said plurality of objects in said image data comprises said first object.
31. The method of paragraph 30, further comprising:
providing a describe objects voice command to said controller; and
outputting an audio object description of each object of said plurality of objects from said identifying and in response to said describe objects voice command.
32. The method of paragraph 31, wherein said audio object description is selected from the group consisting of object type, object color, object size, object position information, and any combination thereof.
33. The method of any of paragraphs 30-32, wherein said controlling is based upon receipt of a select first object voice command.

DETAILED DESCRIPTION

Figure 1A:
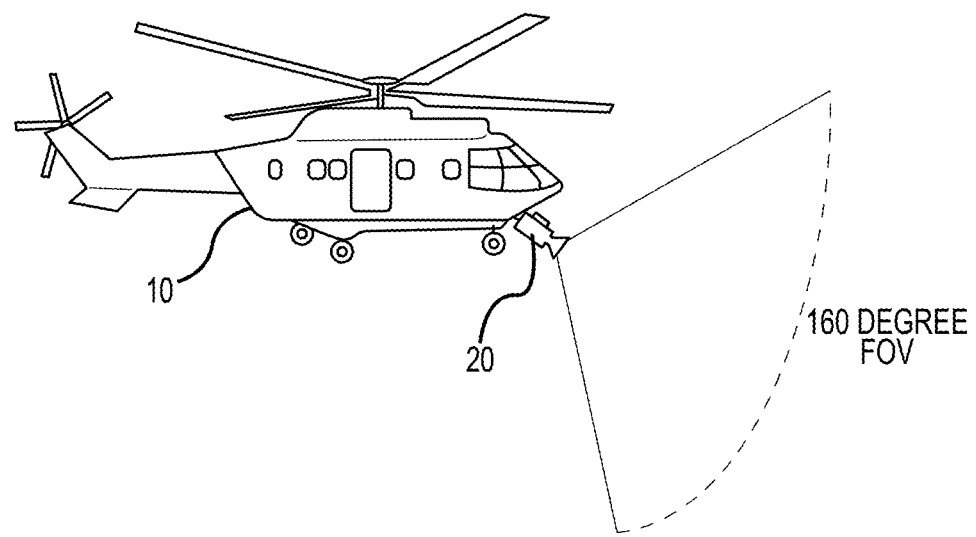
FIG. 1A is a schematic of a helicopter with a search light in a first position.
Figure 1B:
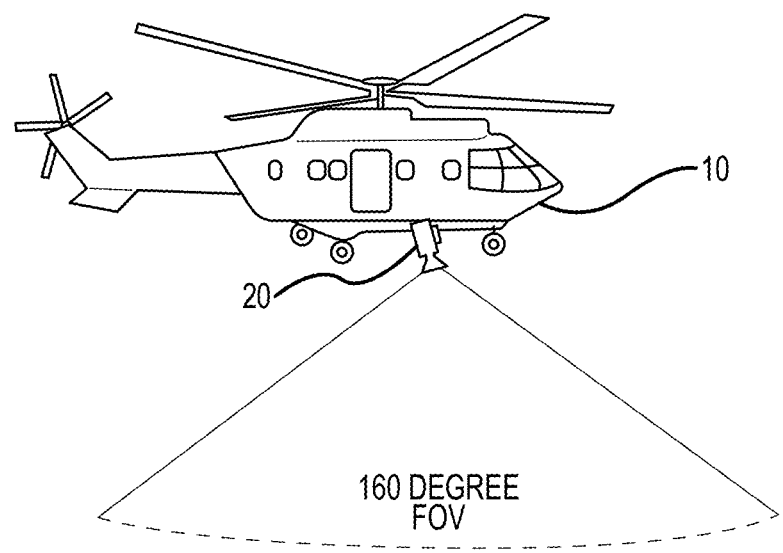
FIG. 1B is a schematic of the helicopter shown in FIG. 1A, but with the search light being in a different, second position.

A representative aircraft is illustrated in FIGS. 1A and 1B in the form of a helicopter 10. The helicopter 10 includes a search light 20 that is movably interconnected with the helicopter 10 in any appropriate manner. The search light 20 is movable relative to the helicopter 10 in at least one dimension, and thereby including in multiple dimensions. The search light 20 may be mounted at any appropriate location on the helicopter 10

Figure 2B:
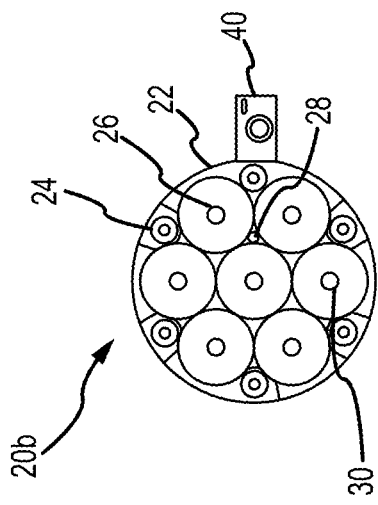
FIGS. 2A, 2B, 2C and 2D illustrate representative configurations for integrating a camera with the search light shown in FIGS. 1A-1B.
Figure 2D:
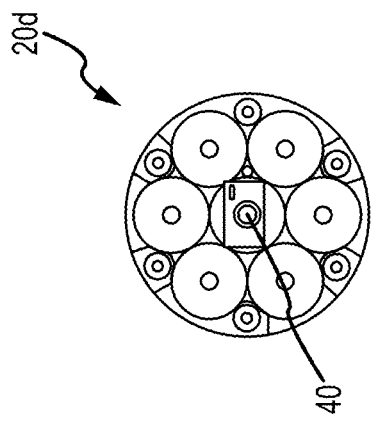
Figure 2A:
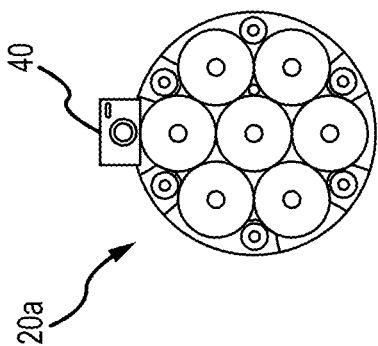
Figure 2C:
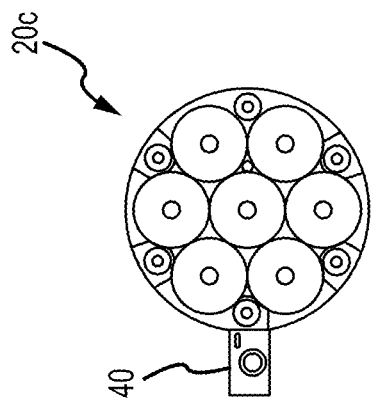

Representative configurations of the search light 20 (e.g., for the helicopter 10) are presented in FIGS. 2A-2D. The search light 20 may include a search light housing or head 22, a floodlight 24, a spot light 26, a distance sensor 28, and an infrared light 30. The search light 20 may be of any appropriate configuration for aircraft applications, and the noted components may be disposed in any appropriate pattern/arrangement. FIGS. 2A-2D differ in relation to how a camera 40 may be integrated/incorporated by the search light 20, such as by being separately mounted to the search light 20. FIG. 2A illustrates the camera 40 being mounted at a top of the search light 20a (and on its outer perimeter). FIG. 2B illustrates the camera 40 being mounted at a right side of the search light 20b (and on its outer perimeter). FIG. 2C illustrates the camera 40 being mounted on at a left side of the search light 20c (and on its outer perimeter). FIG. 2D illustrates the camera 40 being mounted within an interior location of the search light 20d (e.g., centrally disposed).

The camera 40 may be integrated/incorporated by the search light 20 in any appropriate manner. The camera 40 may be of any appropriate configuration (e.g., an area scan 3D camera; an IR projector; an IR camera; a visible light camera). Various embodiments have the camera 40 being in the form of a video camera 40 such that image data acquired and transmitted by the camera 40 is in the form of video (e.g., sequential frames of image data). The camera 40 may be configured to sense optical or IR light. The camera 40 could be disposed inside the body of the search light 20 (e.g., within the search light housing or head 22), or could be outside of the search light 20 (e.g., mounted to an exterior of the search light 20).

Figure 3A:
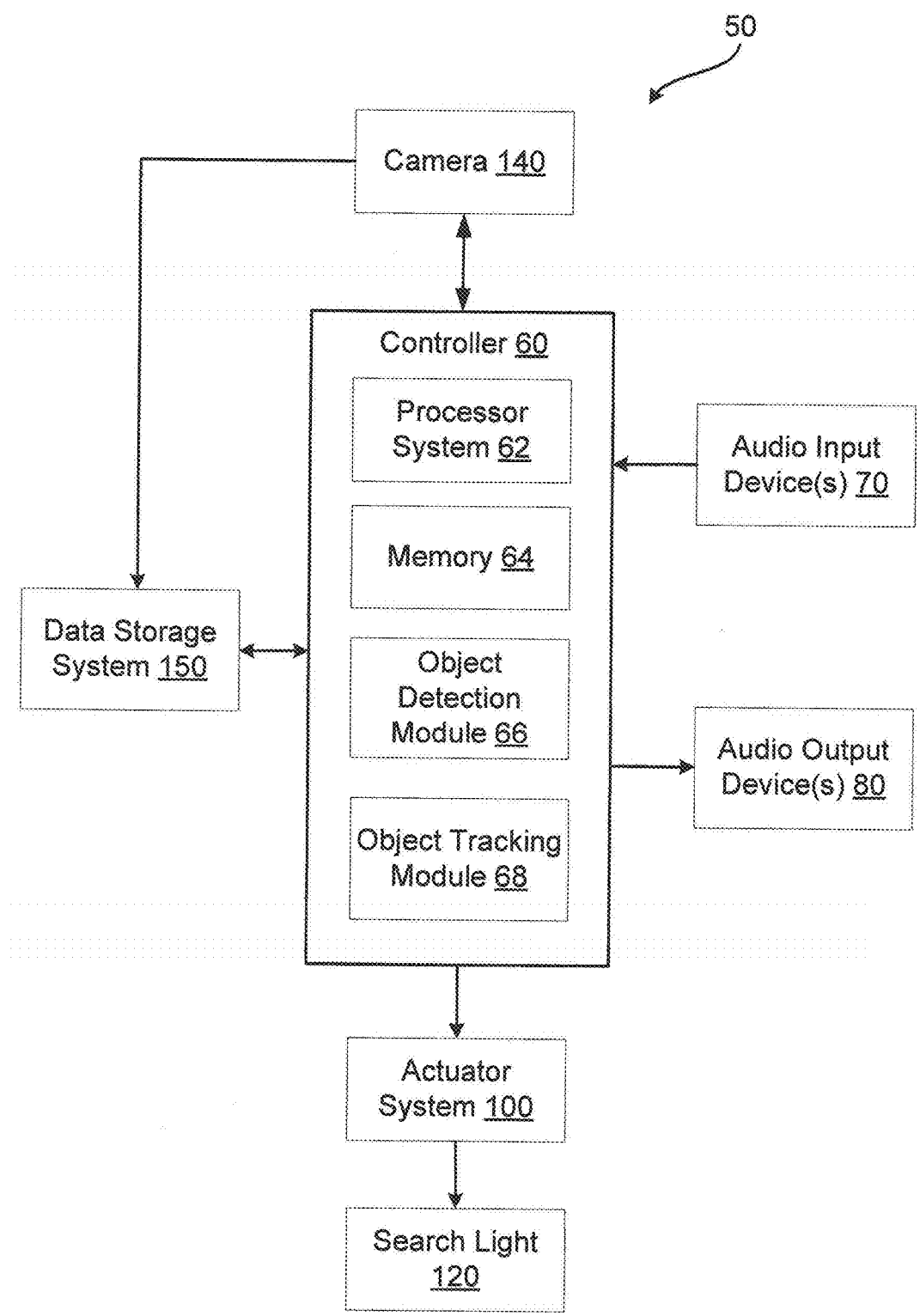
FIG. 3A is a schematic of an aircraft search light system.

An aircraft search light system is illustrated in FIG. 3A and is identified by reference numeral 50. The aircraft search light system 50 may be used by any appropriate aircraft, including the helicopter 10 shown in FIGS. 1A and 1B. The aircraft search light system 50 includes a camera 140, a controller 60, a data storage system or database 150 (e.g., a computer readable storage medium), one or more audio input devices 70, one or more audio output devices 80, an actuator system 100 (e.g., one or more motors, drives/drive sources, or the like; e.g., to move the search light 120 relative to the aircraft in at least one and more typically in multiple dimensions), and a search light 120. The search light 120 may be in accordance with the search lights 20a-20d discussed above in relation to FIGS. 2A-2D, while the camera 140 may be in accordance with the camera 40 discussed above in relation to FIGS. 2A-2D.

The camera 140 of the aircraft search light system 50 may be operatively interconnected with at least the controller 60. Image data from the camera 140 may be provided directly to the database 150 (e.g., the camera 140 could be operatively interconnected directly with the database 150 such that image data from the camera 140 may be at least temporarily stored by the database 150), or to the controller 60 (which may utilize the database 150 or other memory). The controller 60 may communicate with the camera 140 to control one or more aspects of its operation (e.g., to turn on/off the camera 140 via a control signal from this controller 60, such as an audio/voice command provided through an audio input device 70 to the controller 60).

The controller 60 includes a processing unit or a processor system 62. The processor system 62 may utilize one or more processors of any appropriate type and may utilize any appropriate processing architecture. Image data from the camera 140 may be stored in memory 64 (of any appropriate type, and including in the form of a computer readable storage medium) for processing utilizing the processor system 62. For instance, the controller 60 may utilize an object detection module 66 to identify one or more objects in the image data acquired by the camera 140, including where the object detection module 66 uses the processor system 62 and the memory 64. The controller 60 may also include an object tracking module 68, namely to follow a particular object in the image data with the search light 120. The controller 60 may also "pre-process" the image data for use by the object detection module 66 and/or the object tracking module 68. In any caser, the controller 60 is configured to send one or more control signals to the actuator system 100 to dispose the search light 120 in position to illuminate a particular object in the image data from the camera 140 and as will be discussed in more detail below.

The aircraft search light system 50 may be configured for control solely based upon audio input or voice commands provided to the controller 60. In any case and as noted above, the aircraft search light system 50 includes one or more audio input devices 70 of any appropriate type (e.g., a microphone a pilot/co-pilot headset, an external microphone, or the like or the like) to allow one or more aircraft personnel to audibly/verbally provide control input to the controller 60. Any appropriate number of audio input devices 70 may be utilized by the aircraft search light system 50. One or more audio input devices 70 may be incorporated by the aircraft itself (e.g., mounted to the aircraft), may be worn by one or more aircraft personnel, or both. Multiple audio input devices 70 may be utilized (e.g., a primary audio input device 70 and one or more secondary audio input devices 70). In various embodiments only one audio input device 70 can be active/enabled at a time for providing input to the controller 60. One or more of the audio input devices 70 may incorporate/utilize noise-cancelling functionality to provide a sufficiently clear audio signal.

The aircraft search light system 50 further includes one or more audio output devices 80 of any appropriate type (e.g., a speaker, headphones, an earphone, a pilot/co-pilot headset, or the like) to allow the aircraft search light system 50 to audibly communicate with one or more aircraft personnel. Any appropriate number of audio output devices 80 may be utilized by the aircraft search light system 50 and may be distributed throughout one or more locations of the aircraft. One or more audio output devices 80 may be incorporated by the aircraft itself (e.g., mounted to the aircraft), may be worn by one or more aircraft personnel, or both. One or more audio output devices 80 may incorporate/utilize noise-cancelling functionality to provide a sufficiently clear audio signal. Multiple audio output devices 80 may be utilized, including where one of the audio output devices 80 is a primary audio output device 80 and the remainder are secondary audio output devices 80 (e.g., for the case of a multiple-member crew).

The inclusion of one or more audio input devices 70 and one or more audio output devices 80 by the aircraft search light system 50 alleviates the need for an operator of the aircraft (or other aircraft personnel) to monitor/review one or more displays for purposes of controlling the positioning of the search light 120 to in turn illuminate at least one object in the image data provided by the camera 140 (e.g., a selected object or selected objects). Having to monitor one or more displays to manually control the position of the search light to track a desired object could distract one or more aircraft personnel during performance of various other tasks associated with operation of the aircraft. However, the aircraft search light system 50 could have an optional display port for a display to be viewed/monitored by aircraft personnel that may not have a view through a window/windshield of the aircraft.

Figure 3B:
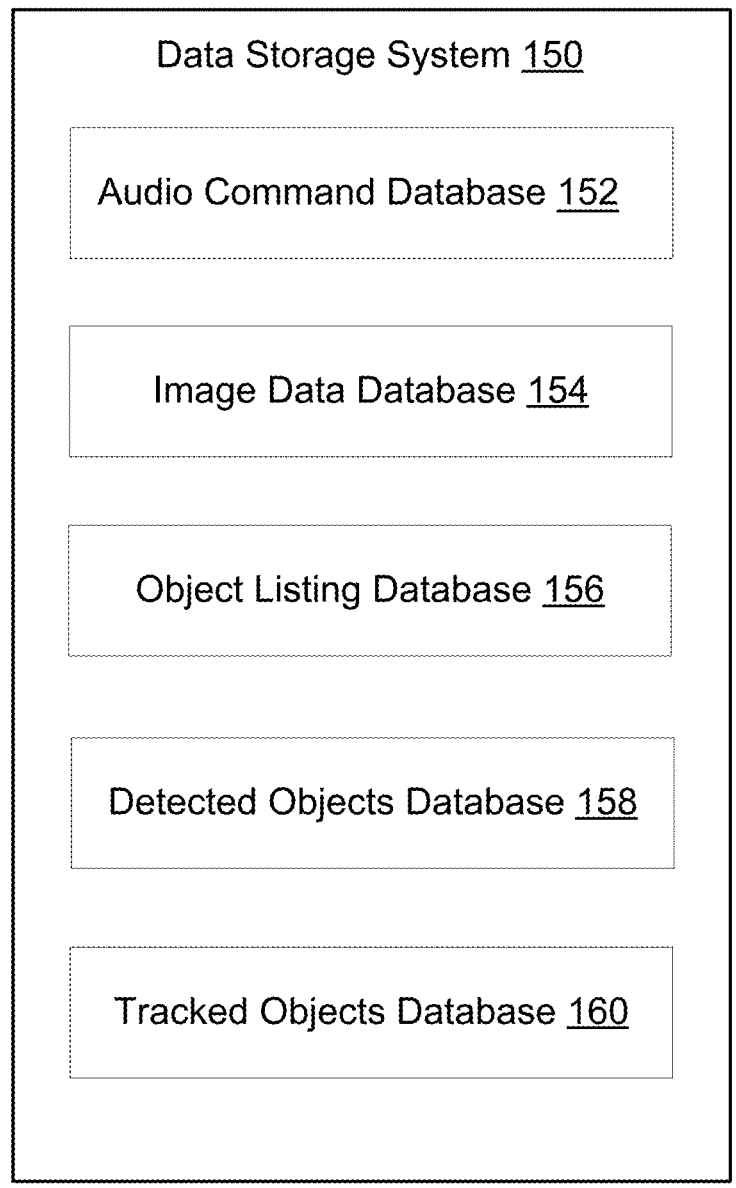
FIG. 3B is a schematic of a data storage system that may be used by the aircraft search light system shown in FIG. 3A.

The database 150 may use any appropriate data storage architecture, and furthermore may be in the form of a computer readable storage medium. A representative configuration of the database 150 is presented in FIG. 3B. The database 150 may include an audio command database or data structure 152, an image data database or data structure 154, an object listing database or data structure 156, a detected objects database 158 or data structure, and a tracked objects database or data structure 160.

The aircraft search light system 50 may be configured such that only predetermined audio/voice commands may be used to control one or more aspects of the operation of the aircraft search light system 50. That is, the system 50 may be configured such that the controller 60 will only respond to audio/voice commands as set forth in the audio command database 152. The audio command database 152 may include each audio/voice command that may be used by aircraft personnel to control one or more aspects of the operation of the aircraft search light system 50, along with the associated action/function. Representative audio/voice commands that may be stored in the audio/voice commands database 152 include without limitation a start object detection command, a describe detected objects command, a lock or select object command (e.g., to identify the object in the image data to be tracked and followed by the search light 120), a stop object detection command, a track object command (e.g., such that the actuator system 100 is operated to move the search light 120 to follow the locked/selected object), a first search light movement command (to identify a direction of movement of the search light 120), a second search light movement command (to identify an amount of movement of the search light 120), and the like. One or more of these commands are discussed in more detail below with regard to a search light control protocol 170 of FIG. 5.

Image data from the camera 140 may be stored in the image data database 154 for subsequent processing by the controller 60. In this regard and as noted, the controller 60 may utilize an object detection module 66 which may be configured to detect various objects in the image data acquired by the camera 140. The controller 60 of the aircraft search light system 50 may be configured to only identify predetermined objects in the image data in the form of predetermined objects that are stored in the object listing database 156 (e.g., the object detection module 66 may be configured to not identify each object in image data from the camera 140—only objects that are stored in the object listing database 156, and which may reduce image processing requirements). Representative objects that may be stored in the object listing database 156 (and identifiable in image data from the camera 140 via the object detection module 66) include without limitation humans, vehicles, trees, roads, streets, emergency vehicles, fire trucks, or the like.

A log or historical record of objects that have been detected by the object detection module 66 of the aircraft search light system 50 (for at least a certain period of time, such as for a single mission/flight of the aircraft) may be stored in the detected objects database 158. A unique identifier may be associated with each detected object in the detected objects database 158. Additional information may be stored in the detected objects database 158 in relation to each detected object, such as at least one characteristic or feature of a given detected object and including without limitation the color of the detected object, the size of the detected object, and the position of the detected object (e.g., relative to other detected objects in the same frame of image data), and the like. Each detected object included in the detected objects database 158 may also be assigned a unique identifier by the controller 60.

As will be discussed in more detail below, a selected object of the objects that are detected by the object detection module 66 may be selected for tracking by the aircraft search light system 50. "Tracking" in the context of aircraft search light system 50 means tracking a selected object with the search light 120 (e.g., via the controller 60 sending control signals to the actuator system 100 to move the search light 120 relative to the aircraft), for instance so as to illuminate the selected object with the search light 120. One or more characteristics/features of the selected object may be stored in the tracked objects database 160 to facilitate this tracking by the controller 60/search light 120. One or more characteristics/features may be stored in the tracked object database 160 that may be used to identify the same selected object in different portions of the image data (e.g., in different frames of image data), such that the search light 120 is positionally controlled by the actuator system 100 to dispose this selected object within the field of view of the camera 140/search light 120.

Figure 4:
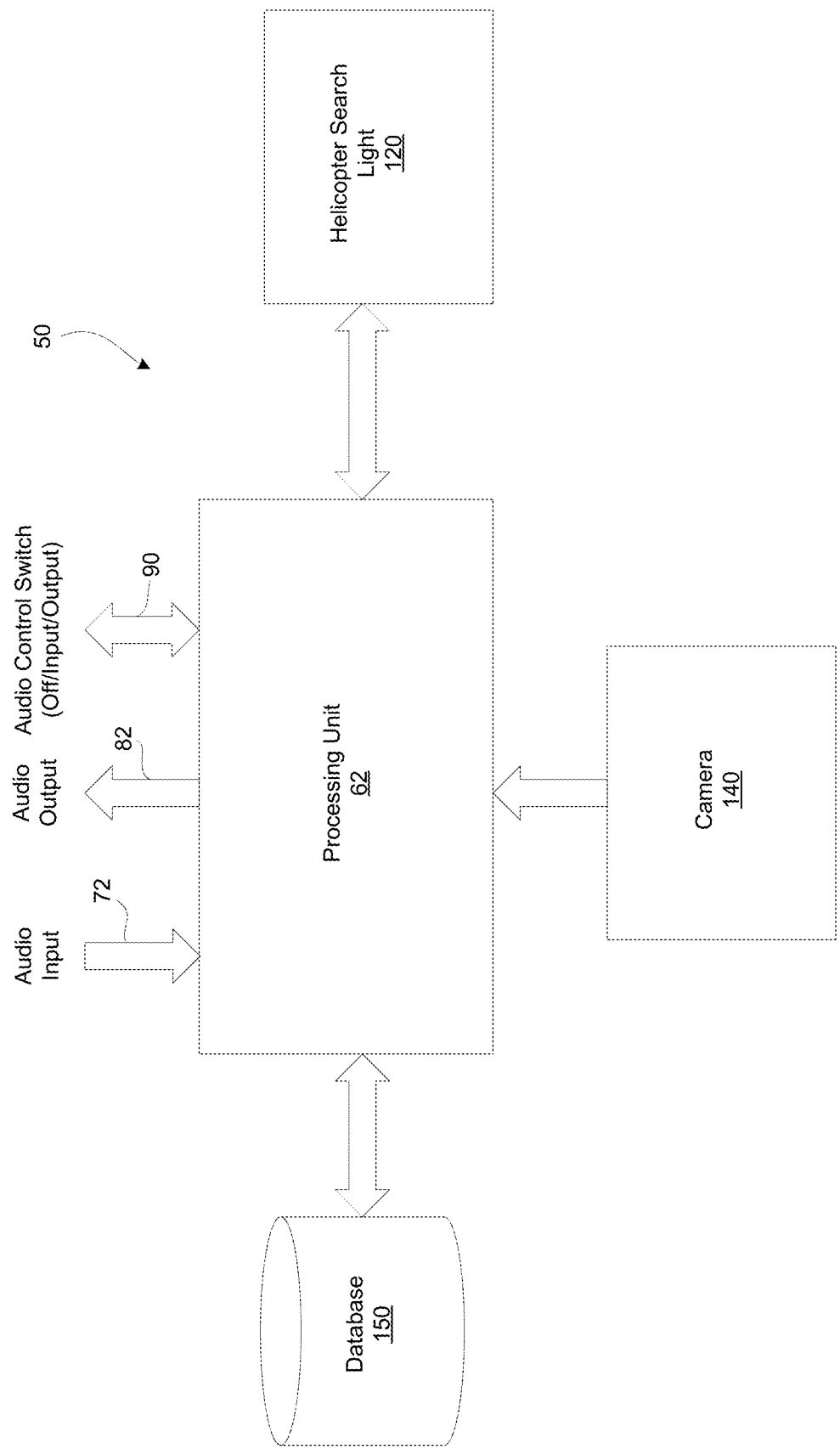
FIG. 4 is another schematic of the aircraft search light system shown in FIG. 3A.

FIG. 4 presents another schematic of at least a portion of the aircraft search light system 50 from FIG. 3A. Audio input 72 from one or more of the audio input devices 70 (FIG. 3A) may be transmitted to the controller 60 (for instance to its processor system 62). Audio output 82 may be transmitted from the controller 60 (for instance from its processor system 62) to control operation of one or more of the audio output devices 80 of the aircraft search light system 50 (e.g., to play a message). An audio control switch 90 may be associated with the processor system 62 and which may be utilized to initiate operation of the controller 60 by an audio/voice command (e.g., a keyword or a combination of keywords). The audio control switch 90 could also be in the form of a physical switch that must be manually activated.

Figure 5:
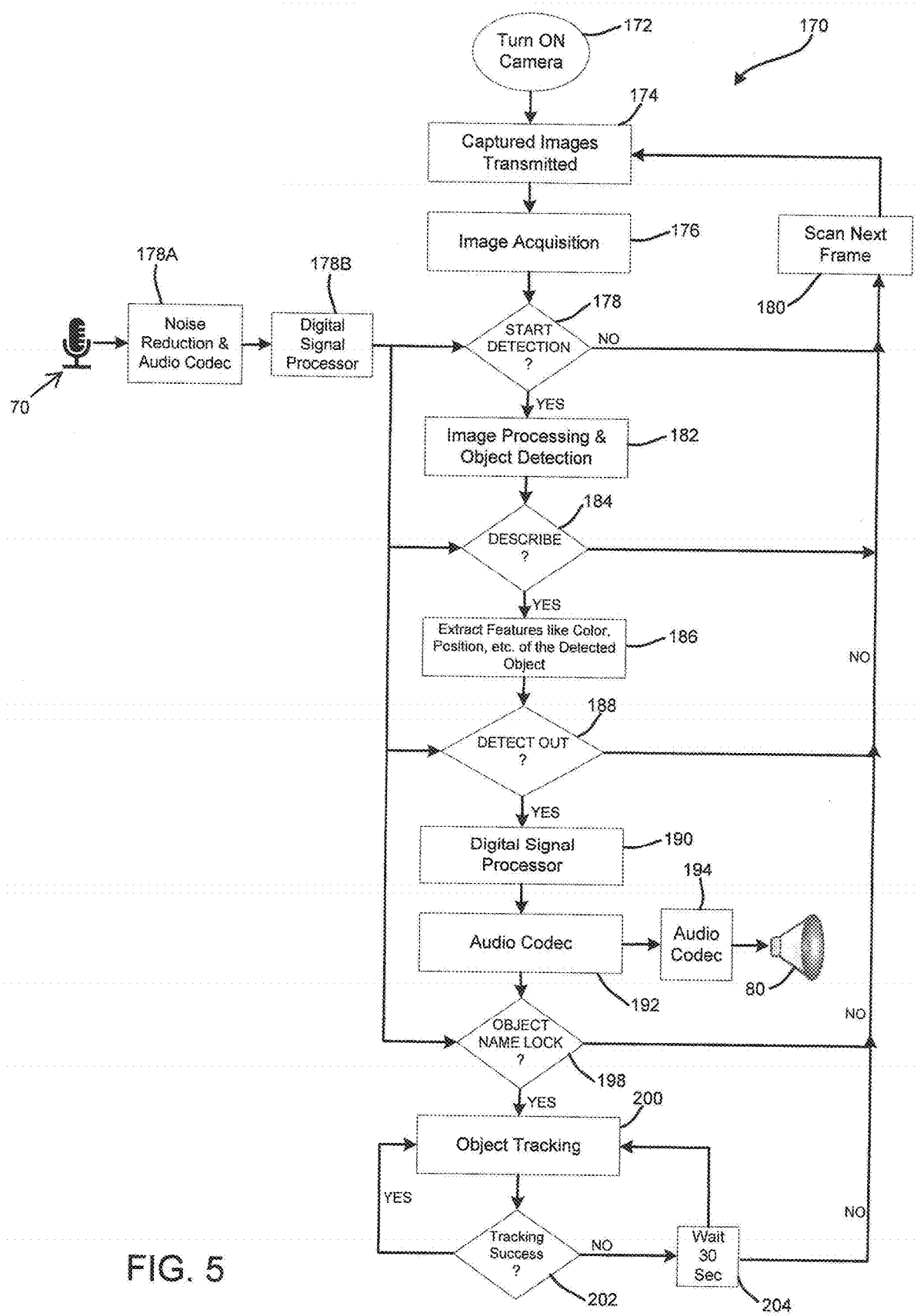
FIG. 5 is a search light control protocol that may be used by the aircraft search light system shown in FIG. 3A.

A search light control protocol that may be used by the controller 60 of the aircraft search light system 50 (FIG. 3A) is illustrated in FIG. 5 and is identified by reference numeral 170. Image data that is acquired by the camera 140 (e.g., video; utilizing step 172, which may turn on the camera 140) is transmitted by the camera 140 and is ultimately transmitted to the controller 60 (step 174), although the image data could be transmitted to the database 150 and thereafter transmitted to the controller 60 for image processing. Initial image processing by the controller 60 (e.g., step 176) can be in the form of acquiring individual frames of image data (e.g., processing video) that may be thereafter processed by the controller 60 for object detection, object tracking, or the like. It should be appreciated that multiple frames of image data could be aggregated on some basis for subsequent image processing by the controller 60.

A determination may be made by the protocol 170 in the form of determining if a command has been received by the controller 60 to start the processing of the image data to identify objects in the image data (step 178—a "start object detection" command). This "start object detection" command may be in the form of an audio/voice command from aircraft personnel through an audio input device 70. The "start object detection" audio/voice command may be used to start the processing of image data, for instance for object detection and/or object tracking purposes.

Audio/voice commands that are provided through an audio input device 70 may be subjected to noise reduction (178A, for instance using a single device that encodes analog audio as digital signals and decodes digital back into analog) and digital signal processing (178B; to amplify the signal level) prior to being transmitted to the controller 60. The audio signal may be processed through a set of analog-to-digital converters (ADCs) or digital-to-analog converters (DACs) to process the signal into a suitable format for the controller 60. Again, the aircraft search light system 50 may be configured to require that all audio/voice commands be from the audio command database 152 in order for the controller 60 to respond to such an audio/voice command (e.g., to undertake the function/task associated with a particular audio/voice command in the database 152).

Generally, any appropriate speech recognition algorithm/algorithms may be used to process audio/voice commands prior to transmitting the same to the controller 60. The speech recognition algorithm(s) may be run on the processed audio input to perform one or more of the following: 1) to remove all synthetic voice outputs such as cockpit warnings generated by other avionics systems, for instance by assessing the frequency of the signal; 2) to normalize or adjust the sound to a constant volume level (e.g. a sound volume normalization), to account for that all aircraft personnel may not speak at the same speed, to match the sound with template sound samples present in memory/data storage, or both; 3) to identify an audio activation signal/keyword (e.g., a predefined keyword or keywords from the audio stream, for instance for purposes of the switch 90 set forth in FIG. 4) by comparing the input and stored values from data storage; 4) once the activation signal/keyword is identified, the controller 60 may be ready to identify and process all predefined audio commands in the audio command database 152; 5) each audio/voice command provided through an audio input device 70 may be analyzed and appropriate action may be undertaken pursuant to the audio command database 152; 6) the required audio outputs may be generated through synthetic voice outputs and audio codes, and may be played through one or more of the audio output devices 80; and 7) the speech recognition algorithm/algorithms may be configured to handle different accents and filter background noise associated with operation of the aircraft. The aircraft search light system 50 may also be configured to be multi-lingual (e.g., for handling different languages for the same commands (e.g., in the audio command database 152), so that the audio command database 152 can be updated for the same language and the required language can be activated as desired/required).

If a "start object detection" command has not been received, the protocol 170 proceeds from step 178 back to step 174 for repetition in accordance with the foregoing. If a "start object detection" command has been received, the protocol 170 instead proceeds from step 178 to step 182.

Image data from the camera 140 (e.g., a frame of image data) is processed in step 182, including image processing to identify objects in the image data (e.g., using the object detection module 66). Again, the aircraft search light system 50 may be configured such that only objects that are stored in the object listing database 156 are available for detection by the object detection module 66.

The protocol 170 may be configured to allow aircraft personnel to provide a "describe" command to the controller 60 (step 184), and which may be in the form of an audio/voice command provided through an audio input device 70. This "describe" command may result in the controller 60 extracting one or more characteristics/features of each detected object in the image data, for instance a color of the detected object, a name/type of the detected object, a size of the detected object, and position/location information on the detected object (step 182), and outputting this information through one or more audio output devices 80. Detected objects with similar characteristics may be combined together for the audio output. The noted information on the characteristics/features of the detected objects may also be stored in the detected objects database 158. A unique identifier may also be associated with each detected object. The protocol 170 could also be configured such that step 186 is executed without a requirement for receipt of an audio/voice command (e.g., step 186 could be executed on an automated or programmed basis, such as time-based and including periodically). Providing this audio information on the detected objects in the image data alleviates the need for aircraft personnel to monitor one or more displays to acquire this type of information.

The protocol 170 may be configured to allow aircraft personnel to provide an "output detected objects" command to the controller 60 (step 188), and which may be in the form of an audio/voice command provided through an audio input device 70, and which could be executed prior to step 184. This "output detected objects" command may result in the controller 60 generating an audio output (through one or more audio output devices 80, and using 190, 192 and 194) that at least generally summarizes the detected objects in the image data at least in some respect (e.g., the number of detected objects, the number of each category of detected objects (e.g., the number of detected vehicles, the number of detected humans)). Providing this audio information on the detected objects in the image data alleviates the need for aircraft personnel to monitor one or more displays to acquire this type of information.

Aircraft personnel may provide a "select object" or "lock object" command to the controller 60 of the aircraft search light system 50, and which may be in the form of an audio/voice command provided through an audio input device 70 (step 198). This "select object" command may be used identify a particular object in the image data to be "tracked" using the search light 120 (a "selected object" or a "locked object"). It should be appreciated that the protocol 170 could be configured to attempt to simultaneously track multiple, selected objects. In any case, the selected object may be identified in any appropriate manner to the controller 60, for instance using one or more of the characteristics/features that were previously identified by the controller 60 and output through one or more audio output devices 80 pursuant to step 188, as well as 190, 192, and 194 of the protocol 170. A sequence of identifiers could be provided by aircraft personnel, through an audio/voice command and via an audio input device 70, to identify a particular object to be tracked in the image data, such as the unique identification number assigned to the object, an object color, an object name, an object location, or any combination thereof.

The features/characteristics of the selected object in one frame of image data may be used by the object detection module 66 to identify this same selected object in subsequent frames of image data. The protocol 170 may be configured to keep the selected object within a predetermined threshold of a center of the field of view of the camera 140/search light 120. Tracking of the selected object is undertaken pursuant to steps 200 and 202. If the selected object is still within the field of view of the camera 140/search light 120 but exceeds the predetermined threshold (still a "yes" for purposes of step 202), the protocol 170 may be configured such that the controller 60 sends a signal to the actuator system 100 to move the search light 120 in a manner that should bring the selected object back to within the predetermined threshold. If the selected object is no longer within the field of view of the camera 140/search light 120, the protocol 170 may be configured with a predetermined delay (step 204) to determine if the selected object reappears in a subsequent frame of image data. Otherwise, the tracking of the selected object may be terminated (although the foregoing may of course be repeated).

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof (e.g., indicating that a surface is at least generally flat encompasses the surface being flat or at least generally flat). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft search light system, comprising:
   a search light;
   an actuator system interconnected with said search light, wherein said actuator system is configured to move said search light in at least one dimension;
   a camera configured to acquire image data;
   a controller operatively interconnected with said actuator system and said camera;
   at least one audio input device operatively interconnected with said controller;
   an object detection module operatively interconnected with said controller, wherein said image data from said camera is provided to said object detection module;
   wherein said controller is configured to control movement of said search light, relative to said aircraft, based upon detection of a first object by said object detection module and receipt of at least one voice command through said at least one audio input device.

2. The aircraft search light system of claim 1, wherein said camera is a video camera.

3. The aircraft search light system of claim 1, wherein said search light comprises said camera.

4. The aircraft search light system of claim 1, further comprising:

at least one audio output device operatively interconnected with said controller.

5. The aircraft search light system of claim 1, further comprising:
an audio input command database comprising a plurality of predetermined audio input commands for said controller, wherein said controller is configured to only respond to each predetermined audio input command of said plurality of predetermined audio input commands.

6. The aircraft search light system of claim 5, wherein said plurality of predetermined audio input commands are selected from the group consisting of a start detection command, a describe detected objects command, a lock object command, a stop detection command, a track object command, a first search light movement command that controls a direction of search light movement, and a second search light movement command that controls an amount of search light movement.

7. An aircraft comprising the aircraft search light system of claim 1, wherein said aircraft is a helicopter.

8. A method of controlling a search light on an aircraft, comprising:
acquiring image data using a camera on said aircraft;
detecting a first object in said image data using a processor system comprising at least one processor; and
controlling movement of said search light, relative to said aircraft, using a controller, based upon said first object from said detecting, and receipt of at least one voice command provided to said controller.

9. The method of claim 8, wherein said detecting is initiated in response to receipt of a detect object voice command by said controller.

10. The method of claim 8, further comprising:
identifying a plurality of objects in said image data using said at least one processor, wherein said plurality of objects in said image data comprises said first object.

11. The method of paragraph 18, further comprising:
providing a describe objects voice command to said controller; and
outputting an audio object description of each object of said plurality of objects from said identifying and in response to said describe objects voice command.

12. The method of claim 10, wherein said controlling is based upon receipt of a select first object voice command.

13. An aircraft search light system, comprising:
a search light;
an actuator system interconnected with said search light, wherein said actuator system is configured to move said search light in at least one dimension;
a camera configured to acquire image data;
a controller operatively interconnected with said actuator system and said camera;
an object detection module operatively interconnected with said controller, wherein said image data from said camera is provided to said object detection module, wherein said object detection module is configured to identify a plurality of predetermined objects in said image data from said camera, and wherein said controller is configured to provide an object detection function on a single object in said image data from said camera in response to receipt of an object selection voice command provided to said controller.

14. The aircraft search light system of claim 13, wherein said controller is configured to generate one or more audio outputs that encompass each of said plurality of predetermined objects that are identified by said object detection module.

15. The aircraft search light system of claim 14, wherein said controller is configured to generate said one or more audio outputs in response to receipt of a predetermined audio command.

16. The aircraft search light system of claim 14, wherein said controller is configured such that said one or more audio outputs include at least one characteristic of a corresponding said object and for each of said plurality of predetermined objects that are identified by said object detection module, wherein said at least one characteristic is selected from the group consisting of object type, object color, object size, and object position information.

17. The aircraft search light system of claim 13, wherein said camera is a video camera.

18. The aircraft search light system of claim 13, wherein said search light comprises said camera.

19. The aircraft search light system of claim 13, further comprising:
an audio input command database comprising a plurality of predetermined audio input commands for said controller, wherein said controller is configured to only respond to each predetermined audio input command of said plurality of predetermined audio input commands.

20. The aircraft search light system of claim 19, wherein said plurality of predetermined audio input commands are selected from the group consisting of a start detection command, a describe detected objects command, a lock object command, a stop detection command, a track object command, a first search light movement command that controls a direction of search light movement, and a second search light movement command that controls an amount of search light movement.

* * * * *